United States Patent
Young

(10) Patent No.: US 6,711,177 B1
(45) Date of Patent: Mar. 23, 2004

(54) METHOD AND APPARATUS FOR MANAGING COMMUNICATION RESOURCES USING FRAME FITTING

(75) Inventor: C. David Young, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/340,881

(22) Filed: Jun. 28, 1999

(51) Int. Cl.$^7$ ................................................ H04J 3/16
(52) U.S. Cl. ...................... 370/468; 370/337; 370/347
(58) Field of Search ................................ 370/310, 315, 370/321, 328, 337, 345, 347, 431, 436, 442, 443, 447, 450, 458, 459, 461, 464, 470, 478, 465, 468, 336

(56) References Cited

U.S. PATENT DOCUMENTS

| | | | | |
|---|---|---|---|---|
| 4,763,322 A | * | 8/1988 | Eizenhofer | 370/337 |
| 5,625,629 A | * | 4/1997 | Wenk | 370/330 |
| 5,719,868 A | | 2/1998 | Young | 370/436 |
| 5,742,593 A | * | 4/1998 | Sharony et al. | 370/347 |
| 5,748,362 A | * | 5/1998 | Delacourt et al. | 359/326 |
| 5,949,760 A | * | 9/1999 | Stevens et al. | 370/280 |
| 5,953,344 A | * | 9/1999 | Dail et al. | 370/337 |
| 6,018,528 A | * | 1/2000 | Gitlin et al. | 370/436 |
| 6,031,827 A | * | 2/2000 | Rikkinen et al. | 370/330 |
| 6,094,429 A | * | 7/2000 | Blanchette et al. | 370/337 |
| 6,252,868 B1 | * | 6/2001 | Diachina et al. | 370/347 |
| 6,275,506 B1 | * | 8/2001 | Fazel et al. | 370/459 |
| 6,310,867 B1 | * | 10/2001 | Tat et al. | 370/254 |
| 6,317,436 B1 | * | 11/2001 | Young et al. | 370/443 |
| 6,324,184 B1 | * | 11/2001 | Hou et al. | 340/7.43 |
| 6,331,973 B1 | * | 12/2001 | Young et al. | 370/337 |
| 2002/0001294 A1 | * | 1/2002 | Amouris | 370/334 |

OTHER PUBLICATIONS

Oono et al. "Dynamic Slot Allocation Technology for Mobile Multi–MEdia TDMA Systems Using Distributed Control Scheme". IEEE. Oct. 12, 1997–19/16/1997. Pp. 74–78.*

Ju et al. "An Optimal Topology–Transport Scheduling Method in Multihop Packet Radio Networks". IEEE/ACM Transactions on Networking. Jun. 1998. Pp. 298–306.*

Chakraborty et al. "Generic Algorthm for Broadcast Scheduling in Packet Radio Networks". Evolutionary Computation Proceedings, 1998. IEEE World Congress on Computational Intelligence. May 4–9, 1998. Pp. 183–188.*

Pond et al. "A distributed Time–Slot Assignment Protocol for Mobile Multi–hop Broadcast Packet Radio Networks." IEEE Military Communications Conference (MILCOM), 1989. Oct. 15–18, 1989. Pp 70–74.*

Chou et al. "Slot Allocation Strategies for TDMA Protocols in Multihop Packet Radio Network". Eleventh Annual Joint Conference of the IEEE Computer and Communications Societies. May 4–8, 1992. Pp. 710–716.*

(List continued on next page.)

Primary Examiner—Chi Pham
Assistant Examiner—Derrick W Ferris
(74) Attorney, Agent, or Firm—Nathan O Jensen; Kyle Eppele

(57) ABSTRACT

A method and system for managing communication resources between nodes in a network, and more particularly to a dynamic distributed multi-channel time division multiple access (TDMA) slot assignment method is presented. The method and apparatus include a set of higher level heuristics that enable the wireless channel access scheme to address predetermined characteristics of the wireless channel access system. These predetermined heuristics include using bootstrap slots, adaptive broadcast cycles, channelized neighborhoods, neighbor segregation, frame fitting, hard circuits, and soft circuits.

8 Claims, 12 Drawing Sheets

OTHER PUBLICATIONS

"Bridging the Gap Interoperability, Survivability, Security" Lawrence Pond and Victor O. K. Li, 1989 IEEE Military Communications Conference, Conference Record, vol. 1 of 3.

IEEE Transaction On Information Theory, vol. It–30, No. 4, Jul. 1984.

"Soldier Phone: An Innovative Approach to Wireless Multimedia Communications", Bittle, Caples, Young, IEEE Military Communications Conference, Milcom 98, vol. 3.

"A Hybrid Distributed Slot Assignment TDMA Channel Access Protocol" Sunlin, IEEE Military Communications Conference, 1990, vol. 3 of 3.

"USAP: A Unifying Dynamic Distributed Multichannel TDMA Slot Assignment Protocol" Young, Milcom 96 Conference Proceedings, vol. 1 of 3.

"Clique Activation Multiple Access (CAMA): A Distributed Heuristic for Building Wireless Datagram Networks" C. D. Young and J. Stevens, IEEE Military Communications Conference, 1998, vol. 1.

Patent Application S/N 09/303,528, Filed Apr. 30, 1999, entitled " Unifying Slot Assignment Protocol Multiple Access System" by C. David Young.

Patent Application S/N 09/303,526, Filed Apr. 30, 1999, entitled " Unifying Slot Assignment Protocol Logical Neighborhooding" by C. David Young.

* cited by examiner

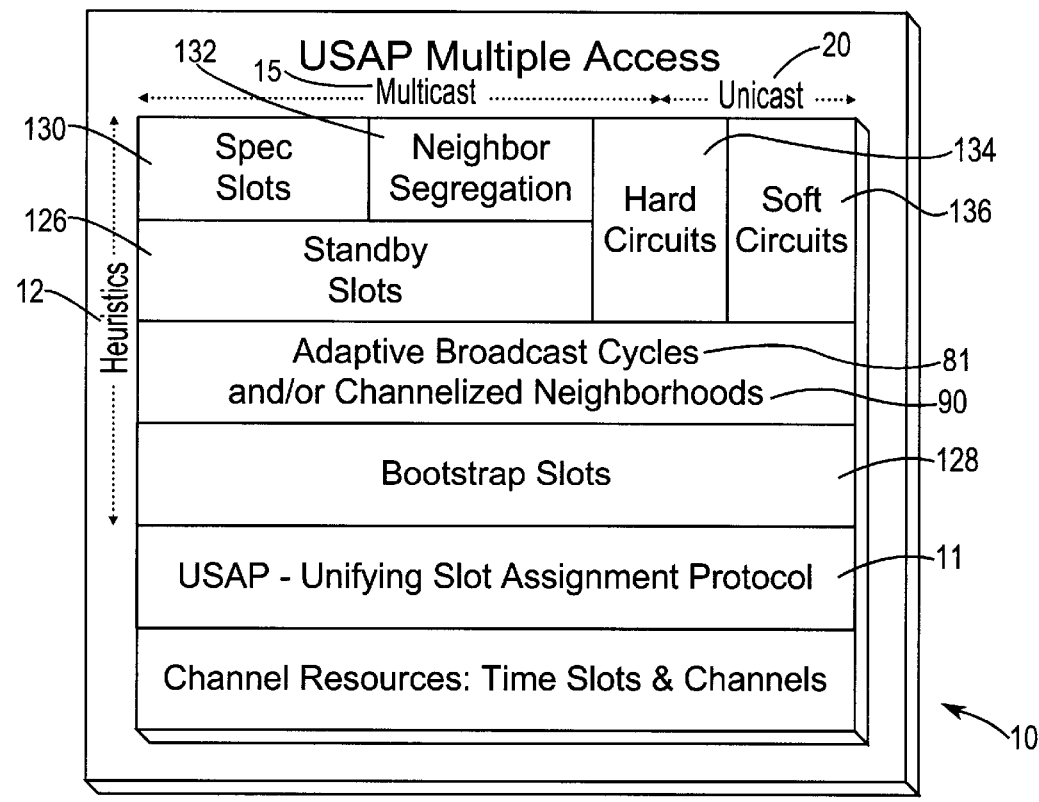
FIG. 2
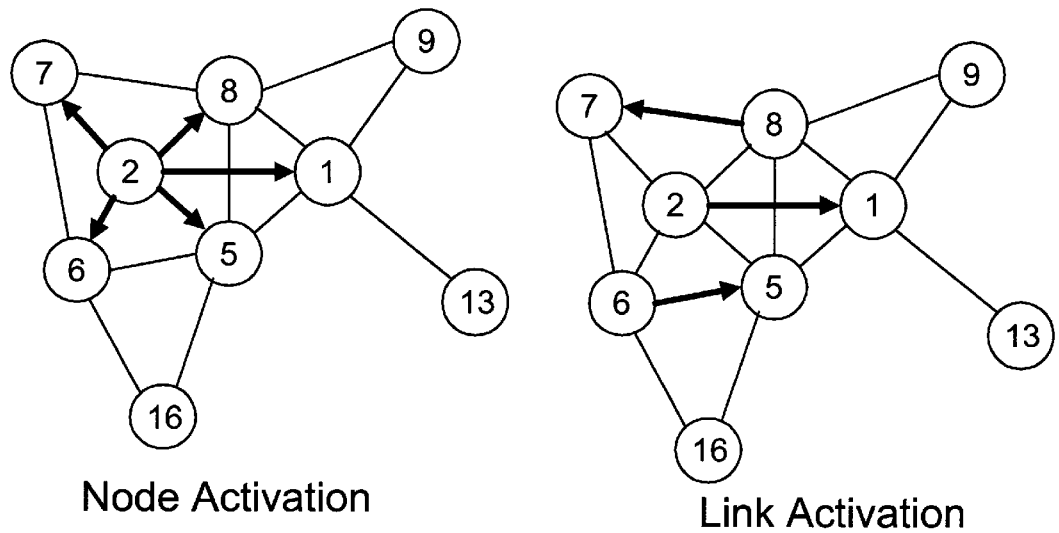
Node Activation
FIG. 3
Link Activation
FIG. 4

USAP-MA Frame Structure and Slot Schedule

| | Bootstrap | Broadcast | | Reservation (Standby Broadcast) | | | | | | | |
|---|---|---|---|---|---|---|---|---|---|---|---|
| F0 | | B0 | B1 | R0 (B0) | R1 (B1) | R2 (B2) | R3 (B3) | R4 (B4) | R5 (B5) | R6 (B6) | R7 (B7) |
| F1 | | B2 | B3 | R0 (B1) | R1 (B2) | R2 (B3) | R3 (B4) | R4 (B5) | R5 (B6) | R6 (B7) | R7 (B0) |
| F2 | | B4 | B5 | R0 (B2) | R1 (B3) | R2 (B4) | R3 (B5) | R4 (B6) | R5 (B7) | R6 (B0) | R7 (B1) |
| F3 | | B6 | B7 | R0 (B3) | R1 (B4) | R2 (B5) | R3 (B6) | R4 (B7) | R5 (B0) | R6 (B1) | R7 (B2) |
| F4 | | B0 | B1 | R0 (B4) | R1 (B5) | R2 (B6) | R3 (B7) | R4 (B0) | R5 (B1) | R6 (B2) | R7 (B3) |
| F5 | | B2 | B3 | R0 (B5) | R1 (B6) | R2 (B7) | R3 (B0) | R4 (B1) | R5 (B2) | R6 (B3) | R7 (B4) |
| F6 | | B4 | B5 | R0 (B6) | R1 (B7) | R2 (B0) | R3 (B1) | R4 (B2) | R5 (B3) | R6 (B4) | R7 (B5) |
| F7 | | B6 | B7 | R0 (B7) | R1 (B0) | R2 (B1) | R3 (B2) | R4 (B3) | R5 (B4) | R6 (B5) | R7 (B6) |

← 1 Sec →

METHOD AND APPARATUS FOR MANAGING COMMUNICATION RESOURCES USING FRAME FITTING

CROSS REFERENCE TO RELATED APPLICATIONS

Cross-reference is made to related U.S. Pat. No. 6,331,973; entitled Unifying Slot Assignment Protocol Multiple Access, and U.S. Pat. No. 6,574,199, entitled Unifying Slot Assignment Protocol Logical Neighborhooding, both filed Apr. 30, 1999.

FIELD OF THE INVENTION

The present invention relates to a method for managing communication resources between nodes of a network, and more particularly to a dynamic distributed multi-channel Time Division Multiple Access (TDMA) slot assignment method using frame fitting.

BACKGROUND OF THE INVENTION

Mobile multi-hop broadcast packet radio networks are known for their rapid and convenient deployment, self organization, mobility, and survivability. In this type of network as illustrated in FIG. 1, a transmission from one node, for example node 1, is broadcast to all nodes in its "neighborhood". Ultra-high frequency (UHF) systems generally have a neighborhood defined by nodes within line of sight of the transmitting node (these nodes being termed within one "hop" of the transmitting node). For example, in FIG. 1 nodes 1, 3, 4, 5, 6, 7, and 8 make up one neighborhood. For data transmitted from node 1 to propagate multiple hops, the data must be relayed by one or more of node 1's neighbors. For example, node "a" (likewise nodes b, c, and g) is two hops away from the node 1 transmitter. The data will be relayed in this manner until it has arrived at all intended destination nodes.

Since there are generally limitations on the number of simultaneous transmissions that a receiver can successfully process (typically one), collisions can be avoided by the assignment of time slots in which individual nodes can transmit. There are many approaches to deciding which nodes are assigned which slots, and the approach is generally driven by the network applications, such as, broadcast, multicast, unicast, datagrams, virtual circuits, etc. Because the problem of optimally assigning slots in this environment is mathematically intractable, a heuristic approach is taken to design an integrated protocol that both chooses the number of slots to assign to each neighboring node and coordinates their activation in the network.

Tactical military and commercial applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers. This functionality is provided by the Unifying Slot Assignment Protocol (USAP) which is the subject of U.S. Pat. No. 5,719,868 the disclosure of which is herein incorporated by reference. The function of USAP is to monitor the RF environment and allocate the channel resources on demand and automatically detect and resolve contention resulting from changes in connectivity.

Wireless channel access schemes traditionally come in two flavors: contention and reservation. Contention has been the favorite for ad hoc broadcast networks because its lack of structure lends itself well to the mobile environment. Also, low access delays make it suitable for both tactical voice, where push-to-talk is the norm, and bursty data. However, when the network is heavily loaded contention is inefficient. At that point a structured access like reservation Time Division Multiple Access (TDMA) can achieve much higher efficiencies.

Another division in this field is the difference between broadcast and unicast. Broadcast techniques, in which a node transmits to all of its neighbors, and unicast techniques, in which a node transmits to only one of its neighbors, both have their own unique advantages dependent upon the application. Traditional wireless systems, however, are not capable of utilizing both broadcast and unicast schemes.

Ideally, a wireless channel access system would support both reserved circuits and datagrams in whatever combination is required. Conventional wireless channel access systems however are not capable of supporting both reserved circuits and datagrams.

Conventional wireless communication systems are capable of handling only one or a small number of data types, including low latency voice, delay tolerant data, bursty transactions, high throughput streams, error sensitive data, and error tolerant video. However, conventional systems are not capable of handling the full range of data types.

Conventional wireless communications systems are typically capable of establishing and maintaining only one type of virtual circuit, including either the establishment and maintenance of hard circuits or the establishment and maintenance of permanent datagram service.

Thus, there is a need and desire for a channel access scheme to use TDMA for wireless communication capable of using both broadcast and unicast techniques dependent upon the state of the communication environments. Further still, there is a need and desire for a wireless communication system that is able to handle a full range of data types including low latency voice, delay tolerant data, bursty transactions, high throughput streams, error sensitive data, and error tolerant video. Further still, there is a need and desire for a channel access system that is capable of providing both reserve circuits and datagram service. Further still, there is a need and desire for a wireless communication system that is able to handle the full range of data types while optimizing for densities ranging from fully connected to sparse and, because of its reliance only on local information, scaling to large network-sizes.

SUMMARY OF THE INVENTION

The present invention relates to a method for managing communication channel resources between nodes having neighboring nodes in a network of nodes. Each node is configured to communicate on the network using a time division multiple access structure which includes time divisions having time frames, each time frame having at least one time slot in which to communicate. The method includes storing, at each node an assignment of possible time slots to communicate between nodes in the network. The method further includes designating the at least one time slot in a first time frame as a first variable length slot and assigning the variable length slot to a particular node. The method also includes updating, at the neighboring nodes of the particular node, the assignment of possible time slots with the assignment of the first variable length slot.

The present invention further relates to a communication system having a network of transceiver nodes configured to communicate between transceiver nodes using a time division multiple access structure. The time division multiple access structure includes a time frame within a time division, the time frame having at least one time slot. The system also includes a frame fitting protocol to selectively allocate variable length slots and fixed length slots from the at least one time slot in the time frame.

The present invention still further relates to a method for automatically managing the communication channel resources between nodes having neighboring nodes in a network of nodes. Each node communicates during specific time slots on a time multiplex basis. The method includes communicating between nodes using a time division multiple access structure which includes time divisions having time frames, each time frame having at least one time slot. The method further includes storing, at each node, possible time slots to communicate between nodes in the network. The method also includes allocating a variable length broadcast slot from the at least one time slot in a time frame and communicating the allocation to the nodes in the network.

BRIEF DESCRIPTION OF THE DRAWINGS

The invention will become more fully understood from the following detailed description, taken in conjunction with the accompanying drawings, wherein like reference numerals refer to like parts, in which;

FIG. 2 is a general block diagram of the USAP multiple access system;

FIG. 3 is a diagram illustrating node activation;

FIG. 4 is a diagram illustrating link activation;

FIG. 6 is a diagram illustrating the frame structure and slot schedule for the USAP multiple access system;

FIG. 9 is a diagram illustrating different exemplary broadcast schedules;

DETAILED DESCRIPTION OF THE PREFERRED EMBODIMENTS

1. USAP Fundamentals

Figure 1:
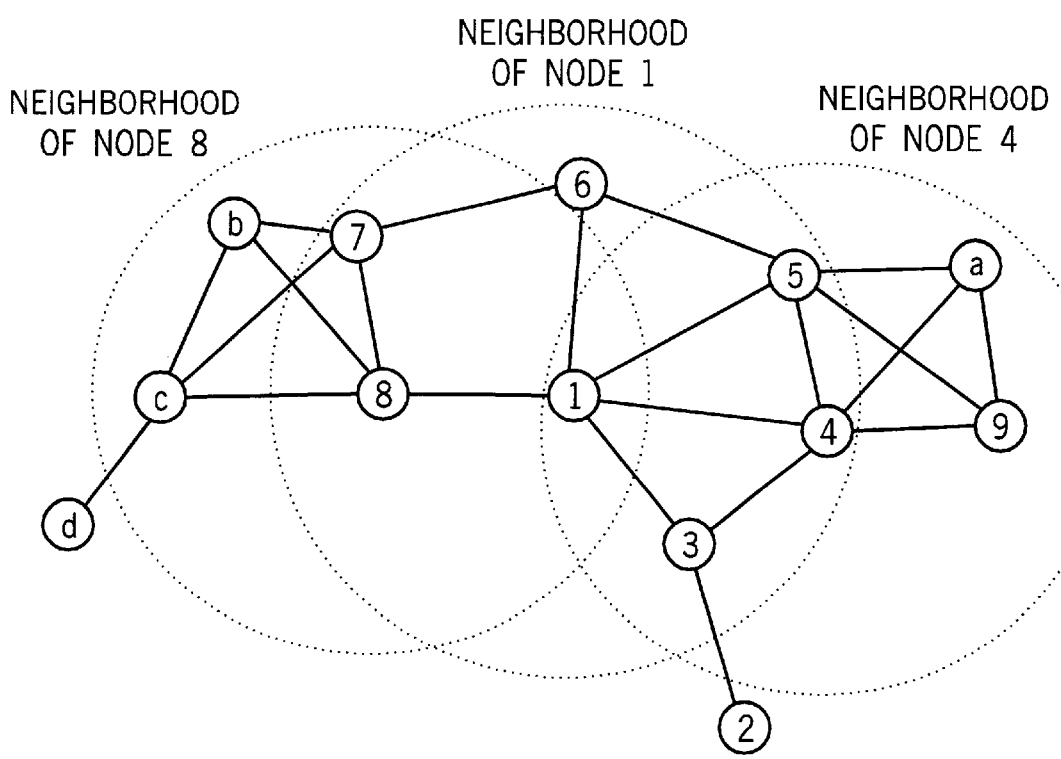
FIG. 1 is a general diagram of a network including nodes.

The problem of optimally assigning slots to be practical in a wireless channel access environment is intractable. Prior to USAP, a heuristic approach was typically taken to design an application specific protocol that both chose the number of time slots (hereinafter referred to simply as "slots") to assign to each neighboring node and coordinated their activation. The USAP approach separates the slot assignment mechanism from the heuristic and creates a single generalized protocol for reliably choosing the slots and coordinating their activation. This can then be used to support many different higher layer heuristics for selecting the number of slots to be activated with which neighboring nodes. Because of its inherent ability to tie together diverse higher layer protocols, it is called the "Unifying Slot Assignment Protocol".

Referring now to FIG. 2; a USAP multiple access (USAP-MA) system 10 is depicted. USAP-MA is a channel access system that results from the integration of USAP 11 with a family of heuristics 12 that enable it to satisfy the requirements of mobile multi-hop broadcast packet networks and similar self-organizing wireless networks operating in a dynamic environment and providing peer to peer, multi-hop, multi-media communications. USAP-MA supports a collection of requirements in a flexible fashion so that the best instantaneous mix can be achieved to match the applications, the loading, and the topology.

Traditionally, there are two methods in which a node transmits to its neighbors, depicted in FIGS. 3 and 4. As depicted in FIG. 3, node activation describes the technique in which a single transmitting node (here depicted as node #2) broadcasts to all of its neighbors simultaneously rather than on an individual basis. When a transmitter has only one intended receiver (for example transmitter #2 has a single receiver #1 depicted in FIG. 4) it is known as "link activation". The former allows only one active transmitter in a neighborhood while the latter can potentially have several.

Node activation is especially well suited for applications like address resolution and conferencing. Link activation, on the other hand, lends itself better to high volume point-to-point traffic. As depicted in FIG. 2, USAP-MA 10 has heuristics to support both under the more common names of multicast 15 (or broadcast) and unicast 20.

Hereinafter, an ordered pair of RF channel and time slot may be referred to as an "allocation". When a node chooses an allocation, USAP enforces certain constraints to avoid interference within 2 hops of the transmitter. For unicast from node i to neighbor j it must be an allocation:

that has not already been assigned to either node;

i's neighbors are not receiving in; and j's neighbors are not transmitting in.

For multicast a node i must choose an allocation:

that has not already been assigned to node i or any of its neighbors; and none of i's neighbors' neighbors are transmitting in.

A node insures that its allocations satisfy the above constraints by sharing the following USAP slot sets with its neighbors:

STi—allocations where a node is transmitting;

SRi—allocations where a node is receiving; and

NTi—allocations where a node's neighbors are transmitting.

To minimize the size of the control packets needed to share this information, it may be more efficient to encode these sets as bit maps or as lists, depending on the number of slots and channels being managed and the density of the network. By exchanging these control packets, USAP has the information it needs to choose non-conflicting transmit allocations consistent with the most recent topology measurements and detect and report conflicts caused by topology changes.

After a transmit allocation is chosen, a node has the option of either using it immediately or waiting until a confirmation is received from each neighbor. The unconfirmed mode is appropriate when it is tolerable to have momentary conflicts due to coincident changes in connectivity or conflicting allocations. The confirmed mode verifies that all neighbors are aware of the allocation and that nothing has happened in the meantime to make it inconsistent with the current topology or other nodes—allocations.

To decide if a slot and a channel are available for either broadcast or unicast transmissions, the USAP methodology may be applied, which is the subject of U.S. Pat. No. 5,719,868 and is described below, however other alternative methodologies exist and could be used in lieu of the USAP methodology.

a. USAP Slot Sets

To choose a slot, a node first generates the set of slots that are not available because they are already in use locally. In the description that follows, the subscript of "i" denotes information about this node and "j" denotes the corresponding information reported by a neighboring node.

Slot Assignments:
S=set of slots
F=set of channels

Self Transmit/Receive Sets:
$STN_i(s,f)$=set of neighbors to which node i transmits on (s,f)
$SRN_i(s,f)$=set of neighbors from which node i receives on (s,f) from which the following sets are derived:
$ST_i(s,f)$=1 if $STN_i(s,f)$ not empty, else 0
$SR_i(s,f)$=1 if $SRN_i(s,f)$ not empty, else 0

Neighbor Transmit/Receive Sets:
$ST_j(s,f)$=the $ST_i(s,f)$ reported by neighbor j
$SR_j(s,f)$=the $SR_i(s,f)$ reported by neighbor j from which the following sets are derived:
$NT_i(s,f)=\cup ST_j(s,f)$ over all neighbors j of node i
$NR_i(s,f)=\cup SR_j(s,f)$ over all neighbors j of node i
$NT_j(s,f)$=the $NT_i(s,f)$ reported by neighbor j If node i or its neighbor j is transmitting or receiving (on any channel) in slot s, it is blocked from doing anything else. To this end the following derived sets are useful:

$B_i(s)=ST_i(s, J) \cup SR_i(s, J)$ for any f
$B_j(s)=ST_j(s,J) \cup SR_j(s,j)$ for any f To decide what slots and channels are available for unicast allocation, a node i constructs the blocked allocations for transmitting to j by excluding allocations already assigned to either node: $B_i(s) \cup B_j(s)$
i's neighbors are receiving in: $NR_i(s,f)$
j's neighbors are transmitting in: $NT_j(s,f)$ This information is combined as follows:

$$\text{Blocked}(i, j, s, f) = Bi(s) \cup Bj(s) \cup NRi(s, f) \cup NTj(s, f)$$

$$= 1 \text{ if } i \text{ cannot transmit to } j \text{ in } (s, f), \text{ else } 0$$

To decide what slots and channels are available for broadcast allocation, a node i constructs the blocked allocations for transmitting to all of its neighbors by excluding allocations already assigned to i : $Bi(s)$
already assigned to any of its neighbors : $\cup_{\forall n \in \{i\_s\_nbrs\}} Bj(s)$
any of i's neighbors' neighbors are transmitting in : $\cup_{\forall n \in \{i\_s\_nbrs\}} NTj(s,f)$ This information is combined as follows:

$$\text{Blocked}(i, s, f) = Bi(s) \cup_{\forall n \in \{i\_s\_nbrs\}} Bj(s) \cup_{\forall n \in \{i\_s\_nbrs\}} NTj(s, f)$$

$$= 1 \text{ if } i \text{ cannot transmit to any of its neighbors in } (s, f), \text{ else } 0$$

b. Reducing Receiver Noise Floor

The data structures of the previous sections are designed to prevent conflicts at a receiver due to multiple transmitters within its neighborhood using the same frequency in the same slot. In some networks it may be desirable to reduce the noise floor at the receivers by adding an additional hop of isolation before an allocation is reassigned. This can be accomplished by defining the set of nodes that are transmitting within 3 hops of node i on an allocation as $NNT_i(s,f)=\cup NT_j(s,J)$ over all neighbors of node i If this is also included in the control packet and stored at the neighbor of node i as $NNT_j(s,f)$ and then the Blocked (i,j,s,f) generated as follows will prevent conflicting transmissions within 3 hops of a transmitter:

$$\text{Blocked}(i, j, s, f) = Bi(s) \cup Bj(s) \cup NRi(s, f) \cup NTj(s, f) \cup NNTj(s, f)$$

$$= 1 \text{ if } i \text{ cannot transmit to } j \text{ in } (s, f), \text{ else } 0$$

2. TDMA Structure

The objectives of many wireless channel access systems are to support both datagrams and on-demand circuits, low latency voice, and network size, density, and mobility consistent with the tactical battlefield. After considering a number of tradeoffs, USAP-MA may have, in a preferred embodiment, the TDMA structure depicted in FIG. 5, although other structures are possible and, if given other constraints, may be more optimal.

Figure 5:
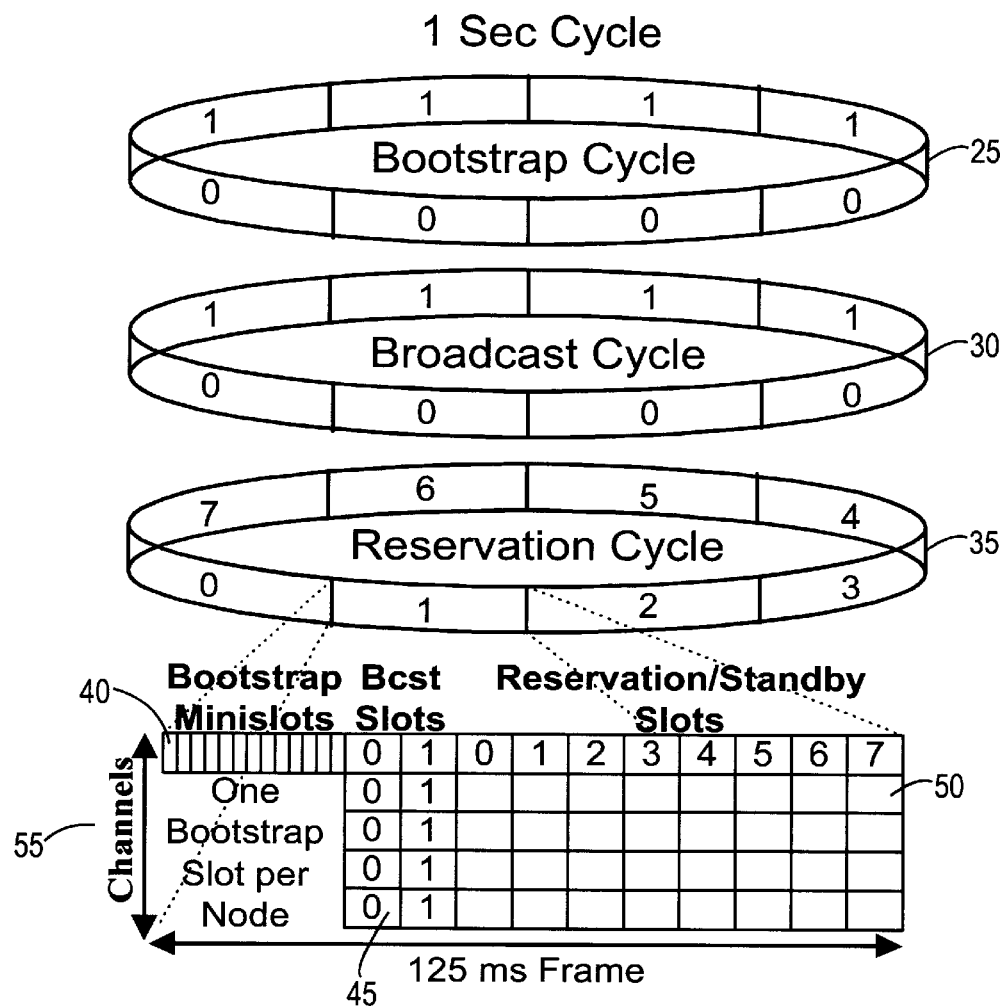
FIG. 5 is a diagram illustrating a time division multiple access structure utilized with the present invention.

As depicted in FIG. 5, the time division multiple access structure can be viewed as three individual cycles, a bootstrap cycle 25, a broadcast cycle 30, and a reservation cycle 35. Each of the cycles depicted are, in a preferred embodiment, a one second cycle, each of the cycles being divided into eight even frames, each frame being 125 milliseconds in length. (The number of cycles, the length of the cycle, and the length of each frame is a matter of design choice, and should not be viewed as limiting; other numbers of cycles, frame lengths, and cycle lengths may be used without departing from the spirit and scope of the present invention.) Each 125 millisecond frame includes a number of bootstrap minislots 40, broadcast slots 45, and reservation/standby slots 50. Further, each frame includes a plurality of frequencies, shown as channels 55.

The frame length of 125 milliseconds is practical because it is deemed acceptable for voice latency, it divides 1 second evenly, and it allows a manageable number of slots per frame. Bootstrap minislots 40 are used for sharing the critical USAP information necessary to dynamically assign the rest of the slots. With 13 bootstrap slots per frame and a bootstrap cycle of 4 frames, up to 52 nodes can be supported although a technique for managing larger nets may also be incorporated into the system. Broadcast slots 45 are node allocations made to support the datagram service and any other control traffic that nodes need to share. With a broadcast cycle of 4 frames, up to eight (8) nodes can transmit in the 2 broadcast slots or a total of up to 40 nodes on 5 different channels in a neighborhood. Reservation slots 50 repeat every frame so their latency is 125 milliseconds

3. Bootstrap Slots

For small networks it is most efficient to assign one permanent bootstrap slot per node, but as network size increases this method results in less and less traffic capacity. Thus, it is desirable to have a technique for dynamically assigning these slots (i.e., bootstrap slot heuristic 128, FIG. 2). However, since the bootstrap packets carry the USAP information necessary for contention-free assignment, each node needs initialization information to coordinate itself with its neighbors. Each new or entering node listens for bootstraps from its neighbors before assigning itself a slot and transmitting its own bootstraps. If a conflict occurs, the effected nodes will learn this from their neighboring nodes via the USAP information and choose another slot.

A fixed or dynamic bootstrap assignment system can be used if a dynamic bootstrap assignment method is used, the bootstrap cycle length will depend on the maximum expected neighborhood density. Assuming a network of size N with a maximum degree D (the most neighbors any one node can have), the following formula can be used:

$$L = \min(D^2+1, N)$$

The $D^2+1$ term is a simple upper bound on the number of colors it takes to do a distance-2 vertex coloring of an undirected graph and this corresponds to the maximum number of bootstrap slots a neighborhood needs for every node to get a slot. (Thus, other formulations for L may be applied without departing from the spirit and scope of the present invention.) One can see that small and/or fully connected networks are best handled by fixed assignments. However, for large networks of reasonable degree the $D^2+1$ term yields a smaller cycle. Indeed, this demonstrates that USAP-MA can manage very large networks with a resource management latency that depends only on the maximum neighborhood density. In fact, that latency can be improved significantly for sparser neighborhoods by simply assigning more slots to each node as described below.

Figure 7:
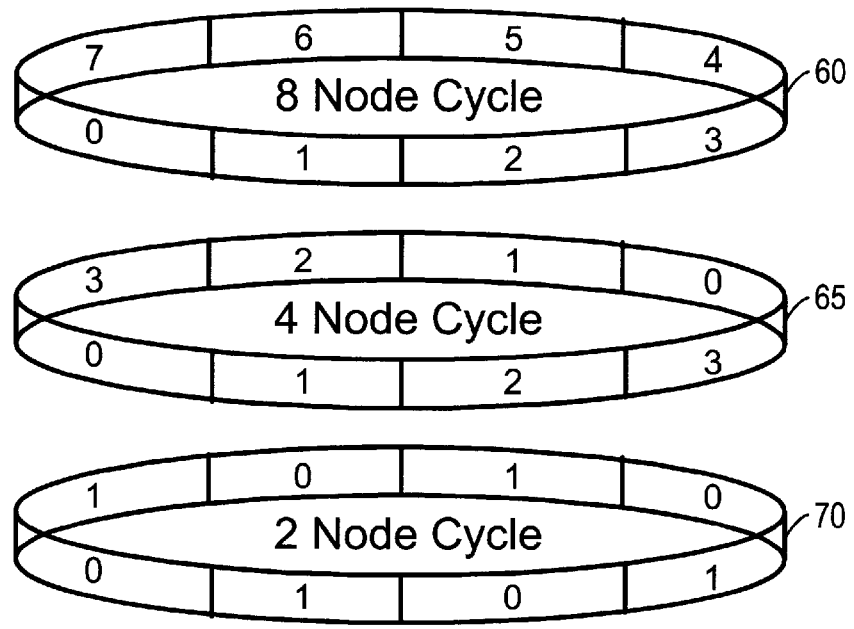
FIG. 7 is a diagram illustrating exemplary broadcast cycles.

An efficient but flexible way to assign more or less slots is to do it in blocks whose size is a power of 2 and whose slots are evenly distributed in the bootstrap cycle. This allows the block to be specified by the first slot index and N where $2^N$ is the size of the block. In fact, if the first slot indices are chosen to be as small as possible then the size of the blocks can be adjusted up or down with maximum flexibility. This technique is very similar to the Adaptive Broadcast Cycle and Slot Poaching to be described shortly but it deserves its own treatment here. Consider the short broadcast cycle 60 depicted in FIG. 7 that can accommodate up to eight (8) nodes.

Sparser neighborhoods could optimize down to 4 node cycles 65 or 2 node cycles 70 if the nodes continually assign themselves the lowest available slot index, thereby packing themselves into the lower portion of the cycle. Under certain conditions a node can reuse unassigned slots in the latter part of the cycle if they correspond to its transmit slot on a shorter cycle. A node gleans this knowledge about its neighbors from the USAP information in their bootstraps, as will be described with regards to slot poaching. An exemplary network where this optimization is possible is depicted in FIG. 8.

Figure 8:
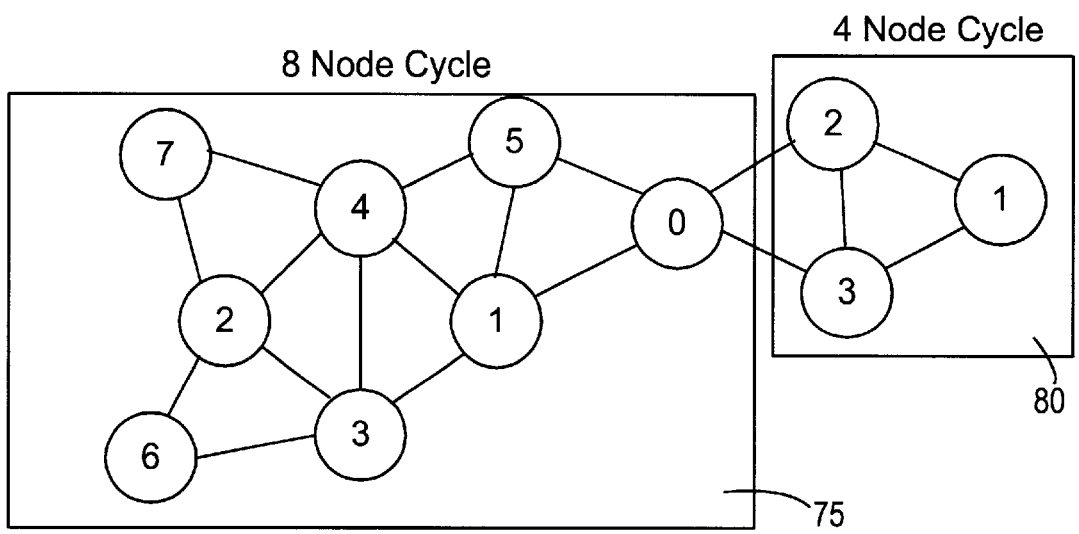
FIG. 8 is a general diagram of a network depicting different broadcast cycles for different nodes.

The nodes in FIG. 8 are numbered by their slot index and the first group 75 has packed themselves into an 8-node cycle. This allows the 3 nodes of second group 50 the right to use a 4-node cycle. It should be noted that the present invention is in no way limited to the configuration or the node cycles depicted in FIG. 8. Any of numerous configurations and node cycles could be used while still achieving a methodology for dynamically assigning bootstrap cycles.

4. Adapting to Network Density

One of the hardest problems to solve in broadcast networks is how to efficiently manage network densities ranging from sparse to fully connected. USAP-MA uses a combination of techniques to solve this problem. To handle sparse neighborhoods the Adaptive Broadcast Cycle 81 (ABC), depicted in FIG. 2, employs nested subdivisions of the fixed length cycle to allow nodes to reuse unused slots. On the other hand, neighborhoods whose density exceeds the capacity of the broadcast cycle utilize Channelized Neighborhoods 90 (CN) to create parallel cycles on other channels so that multiple neighboring transmitters can be active in any given slot. The fusion of these methods results in efficient channel utilization over the entire range of connectivity.

a. Adaptive Broadcast Cycle (ABC)

Figure 9:
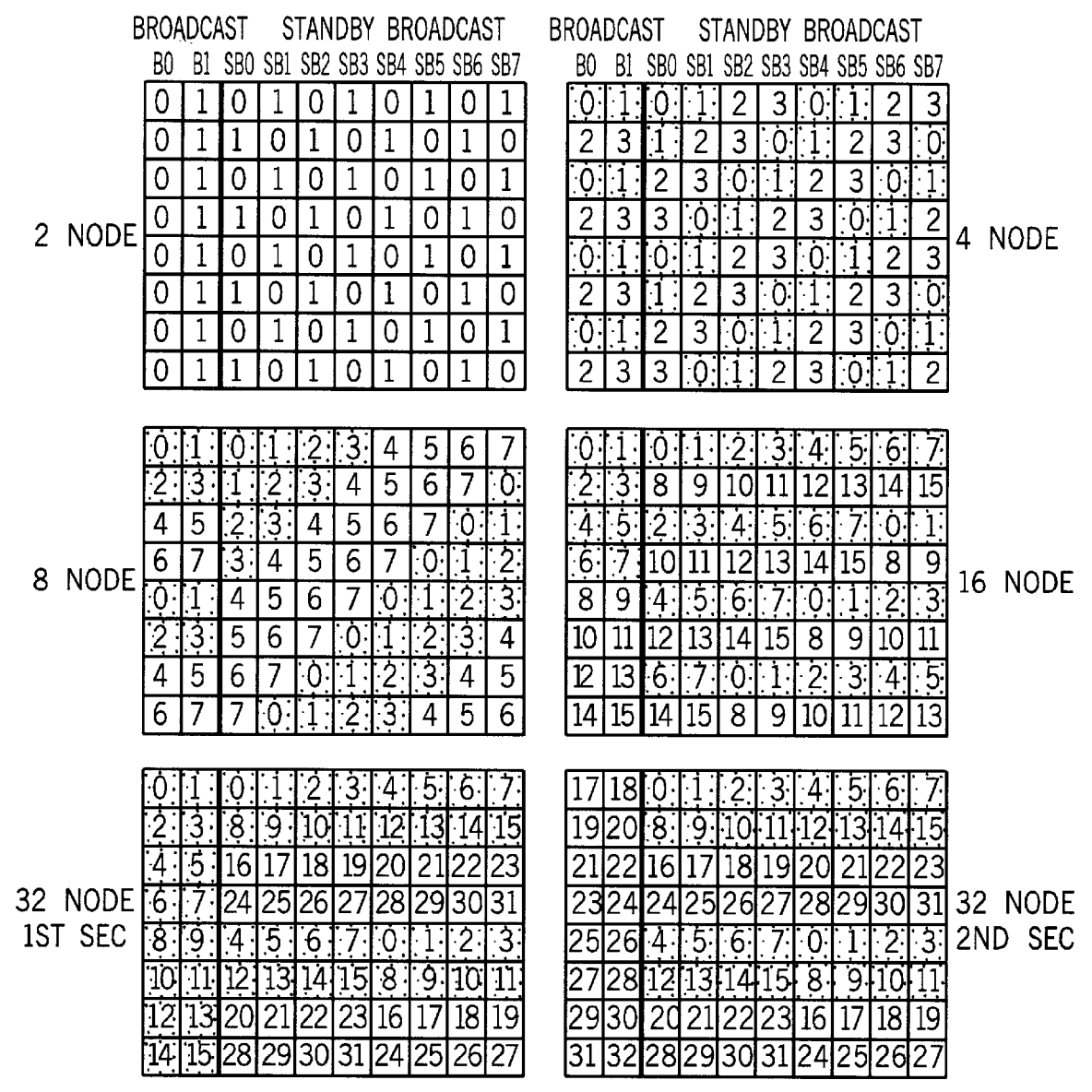

A number of possible broadcast schedules are depicted in FIG. 9, each for a different neighborhood density, that is, the maximum number of nodes before CN 90 (FIG. 1) takes effect. As depicted in FIG. 9, a number in a slot corresponds to the assigned broadcast slot. In other words, if a node has chosen broadcast slot N, the standby slots with the number N are also it's transmit opportunities. They are designed to have the following properties:

They maximize overlap such that a schedule has half of its slots in common with both the previous schedule (shown shaded) and the next schedule. This eases transitions from one schedule to the next as the density changes.

The standby slots are shifted from frame to frame to minimize the impact a reservation slot has on broadcast latency.

A schedule is chosen based on the location of the assigned broadcast slot and any open slots that come after it in the broadcast cycle. If there are open slots corresponding to the assigned slot on a shorter cycle, the node may be able to adopt the shorter cycle as described with regards to slot poaching, described below. To make this work, a node continually looks for empty slots earlier in the cycle and tries to move its broadcast allocation to that slot. This has the effect of packing the allocated slots into the earlier part of the cycle and allowing the cycle to be shortened as density decreases.

b. Slot Poaching

One way to implement ABC 81 (FIG. 1) is to allow a node to transmit in or "poach" unassigned slots according to a shorter cycle if no other transmitter will use them within two hops of this node. This feature exploits the USAP information available at each node, the schedules of nested blocks of $2^k$ slots, and the fact that a node can be ready to receive in any slot. If the basic broadcast cycle is long enough to accommodate the maximum network density, poaching will provide shorter cycles for sparser neighborhoods. For instance, poaching would allow an 8-node schedule to achieve the efficiency of a 2 or 4 node schedule whenever possible.

The set of slots P consisting of the original assigned broadcast slot plus the poached slots can be defined as $$P=\{p|p=i+j2^k\}$$

Where i=index of assigned broadcast slot j=0, 1, . . . , n such that p<basic broadcast cycle k=integer such that $2^k$=size of cycle and $i<2^k$ In order for P to be free of conflicts, the intersection of it with Blocked(i,s,f) must be empty except for the assigned broadcast slot i. This can be accomplished with the following procedure:

1. Start with the smallest k that satisfies $i<2^k$.
2. If $2^k$ is the basic broadcast cycle then no poaching is possible and we are done.
3. If the intersection of P and Blocked(i,s,f), from USAP, is just i, then P is valid and we are done. Else, increment k and go to 2.

Figure 10:
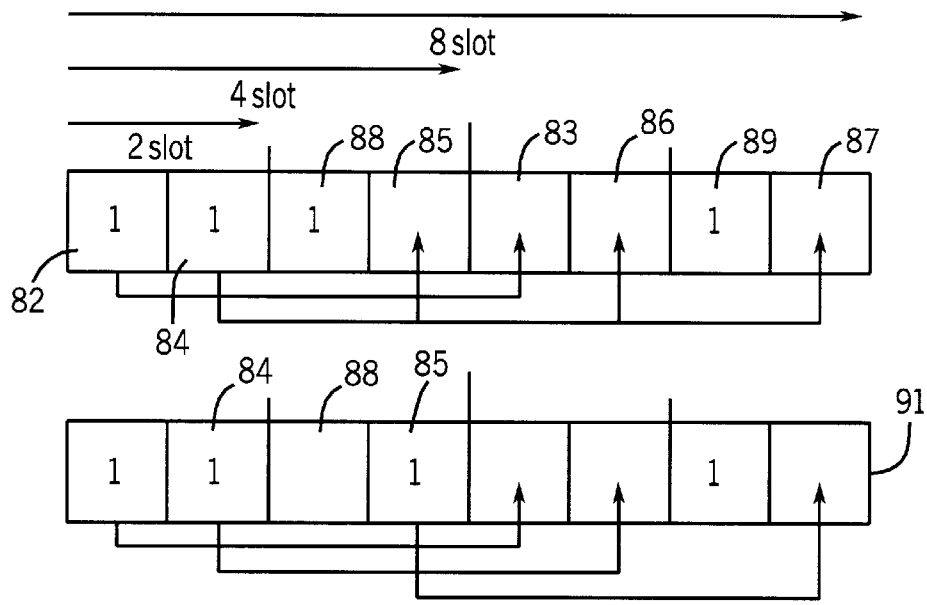
FIG. 10 is a diagram illustrating an exemplary process of slot poaching.

In FIG. 10, an 8 slot basic cycle is represented with the blocked slots marked with a 1. The nodes transmitting in the left half of the cycle try to poach. Slot 82 can poach slot 83 and slot 84 can poach slots 85, 86, and 87. However, slot 88 is blocked by slot 89 and cannot poach. Note however that if slot 88 were to move to slot 85 (depicted in the second cycle 91) then it could poach also, albeit at slot 84's expense. This shows that the packing in the lower part of the cycle can be optimized to maximize the potential for poaching.

A simple proof that this node will not conflict with another node trying to poach the same slot is as follows. Step 1 establishes the smallest poach cycle this node will consider while step 3 increases the size of the cycle if another transmitter is active in P. If there is another active transmitter, it will have an i greater than this node by a factor of $2^k$, say $m2^k$, and have a P defined as follows with respect to this node:

$$P=\{p|p=i+m2^k+r2^q\}=\{p|p=i+(m+r2^{q-k})2^k\}$$

Where i=index of assigned broadcast slot of this node r=0, 1, . . . , n such that p<basic broadcast cycle q=integer such that $2^q$=size of cycle and $(i+m2^k)<2^q$ Thus, this node will not consider an unused slot without also considering the slot assigned to the other transmitter (r=0) that might also consider that slot, which will disqualify P. Thus, two nodes can not choose the same P.

c. Offline Neighborhoods

Nominally ABC 81 utilizes just one channel. However, if a group of nodes needs to share data at a higher rate than is provided by the datagram service of the broadcast channel, they may utilize one of the other available channels and take advantage of a shorter broadcast cycle to create additional throughput. For instance, a videoconference could be set up that might tax the normal broadcast channel. However, if there were only a few nodes involved and they could afford to temporarily form their own subnet, they could switch to another channel and use a shorter broadcast schedule. Note that they would still maintain contact with the main network via the bootstrap packets in case of an urgent request to return to the main channel. This would not only allow them to greatly increase the throughput among themselves but also, since there are fewer nodes involved, to minimize the control traffic that they must share to maintain the subnet.

5. Channelized Neighborhoods

Figure 11:
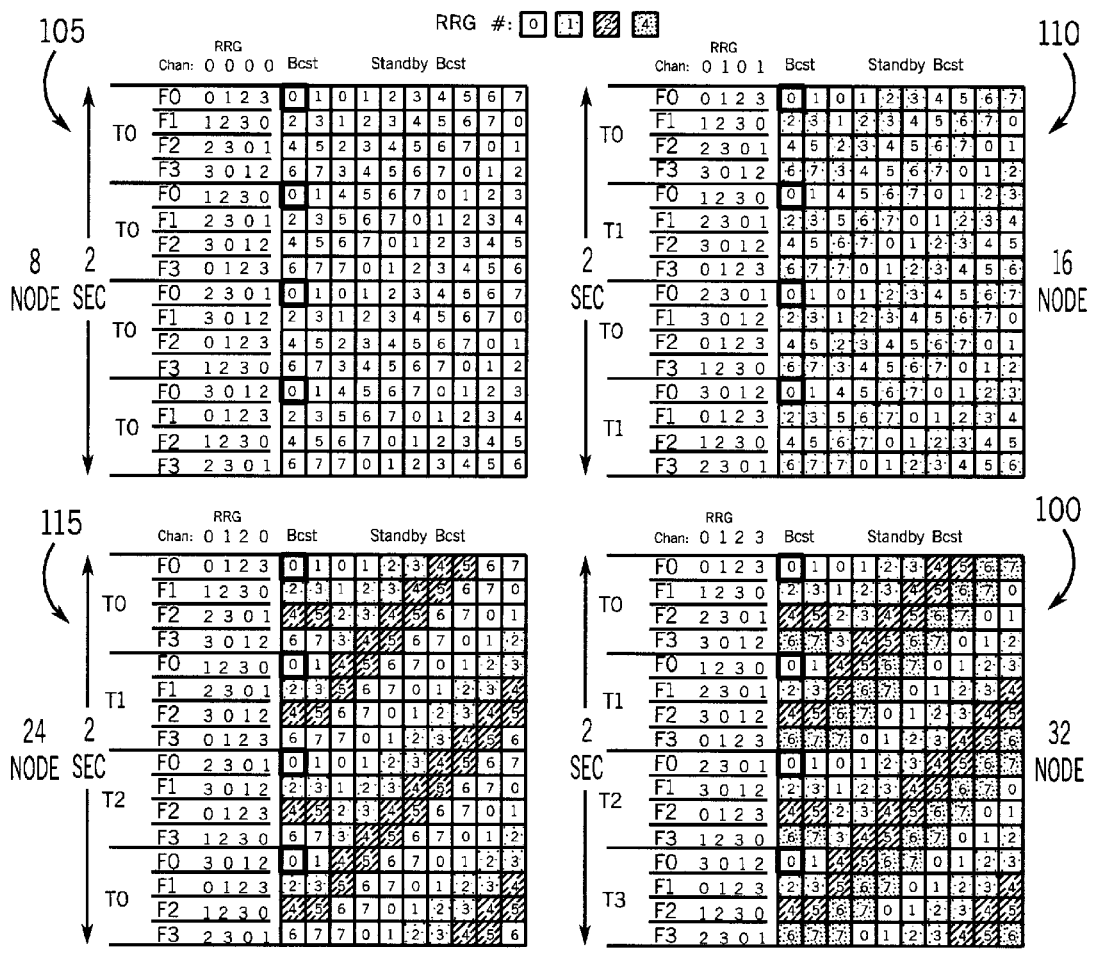
FIG. 11 is a diagram illustrating a time division multiple access schedule using channelized neighborhoods.

If the number of broadcast slots is limited to eight (8), communication with more than seven (7) neighbors requires the use of additional broadcast cycles, where cycles can be separated by time or channel that is into channelized neighborhood 90 (FIG. 2). USAP-MA uses the latter approach to maximize channel utilization. For a receiver to hear from each transmitter, it rotates from one channel to another according to the schedule in which a 2-second epoch is broken into four (4) cycles, each of four (4) frames. As depicted in FIG. 11, the schedules for the 8, 16, 24, and 32 node cases are presented. A Rotating Receiving Group (RRG) is made up of the four (4) pairs of nodes that share the same frame on each channel. An RRG will visit a different channel each frame so that at the end of an epoch (in a preferred embodiment an epoch lasts 2 seconds; however, an epoch may be of any defined length) each receiver will get a chance to receive from up to twenty-eight (28) transmitters in a 32-node neighborhood. The reason that not all thirty-one (31) transmitters are heard at every receiver is that the nodes with the same transmit slot will never receive from each other. This has the result that these nodes will not be recognized as logical neighbors even if they are physical neighbors. Communication between them can be achieved over relays or a further optimization can be made to change the RRG memberships each epoch in such a way as to evenly distribute the receive opportunities over time.

The {T0,T1,T2,T3} schedule 100 presented for the 32-node neighborhood can be optimized for sparser neighborhoods. In particular, an 8-node neighborhood uses a {T0,T0,T0,T0} schedule 105 for single channel operation, a 16-node neighborhood uses a {T0,T1,T0,T1} schedule 110 for 2-channel operation, and a 24-node neighborhood uses a {T0,T1,T2,T0} schedule 115 for 3-channel operation. Since the perception of neighborhood density can change from one node to the next, the nodes must let each other know each other's schedules. This is done via a couple of bits in the bootstrap. When a node prepares to transmit, it can calculate which of its neighbors will be listening during that time slot according to the schedule in effect at each neighbor. Note that each node always transmits in its allotted time slot and channel. The receivers are the ones that rotate among the transmitters on different schedules depending on the neighborhood density and the RRG they belong to.

a. Channel Assignment Order

Figure 12:
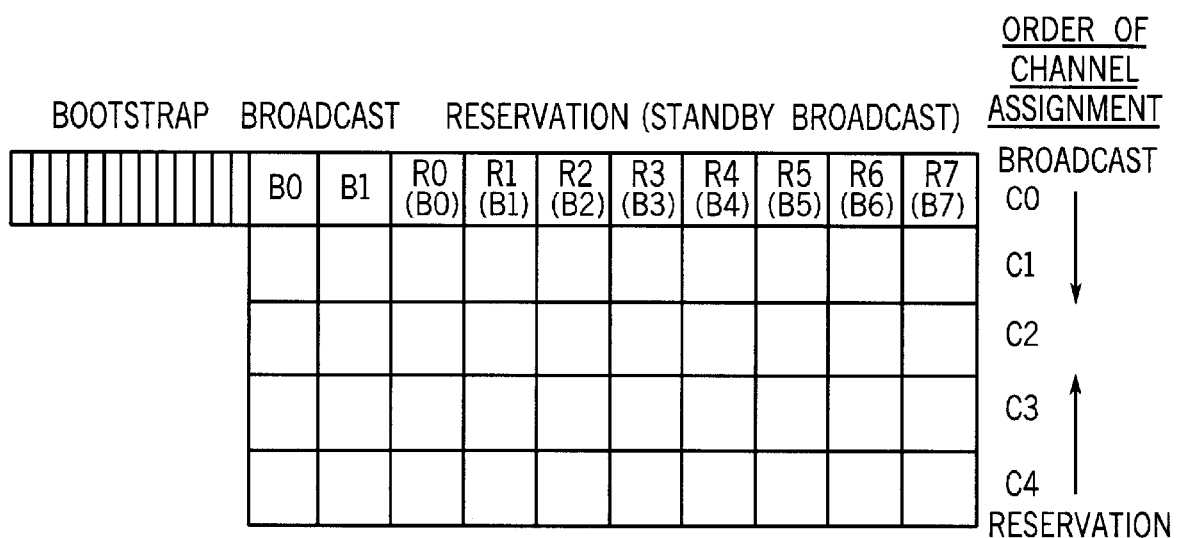
FIG. 12 is a diagram illustrating an exemplary channel assignment order.

USAP-MA uses a further optimization to decrease the impact on the broadcast channel of assigning unicast reservation slots. As depicted in FIG. 12, the USAP-MA has, in a preferred embodiment, five (5) channels available to it numbered 0 to 4 (labeled C0 to C4 in FIG. 12). If the broadcast channels are assigned in the order of 0 to 4 and the reservation slots on channels in the reverse order of 4 to 0, there will be minimal overlap between the broadcast and reservation slots until the network gets heavily loaded. In fact, when a unicast reservation is made on channel 4, it has no impact on the broadcast channel except that the two unicast nodes are unavailable during that slot for broadcast. Furthermore, if reservations were limited to two channels, which still gives much flexibility for unicast assignments, there would be no possibility of reduced broadcast capacity until the neighborhood density reached twenty-four (24) and the broadcast channel spilled onto channel 3. This is yet another example of how USAP-MA maximizes channel utilization while allowing substantially simultaneous contentionless unicast and broadcast transmissions in the same neighborhood.

b. Fair Channelized Schedules

In order to allow all nodes to receive from each transmitter in a fair fashion, it is necessary to periodically change the RRG membership. Recall that the RRG is made up of the four pairs of nodes that share the same frame, where one pair comes from each channel. By shifting the transmit schedule on each channel a different amount each two (2) second epoch a different set of receivers will be active on any particular slot and channel from one epoch to the next. One such shift set {0,1,3,5} results in the following shift schedule for each channel over a 16-second period:

| Chan | Epoch 0 | Epoch 1 | Epoch 2 | Epoch 3 | Epoch 4 | Epoch 5 | Epoch 6 | Epoch 7 |
|------|---------|---------|---------|---------|---------|---------|---------|---------|
| 0    | 0       | 0       | 0       | 0       | 0       | 0       | 0       | 0       |
| 1    | 0       | 1       | 2       | 3       | 4       | 5       | 6       | 7       |
| 2    | 0       | 3       | 6       | 1       | 4       | 7       | 2       | 5       |
| 3    | 0       | 5       | 2       | 7       | 4       | 1       | 6       | 3       |

Figure 13:
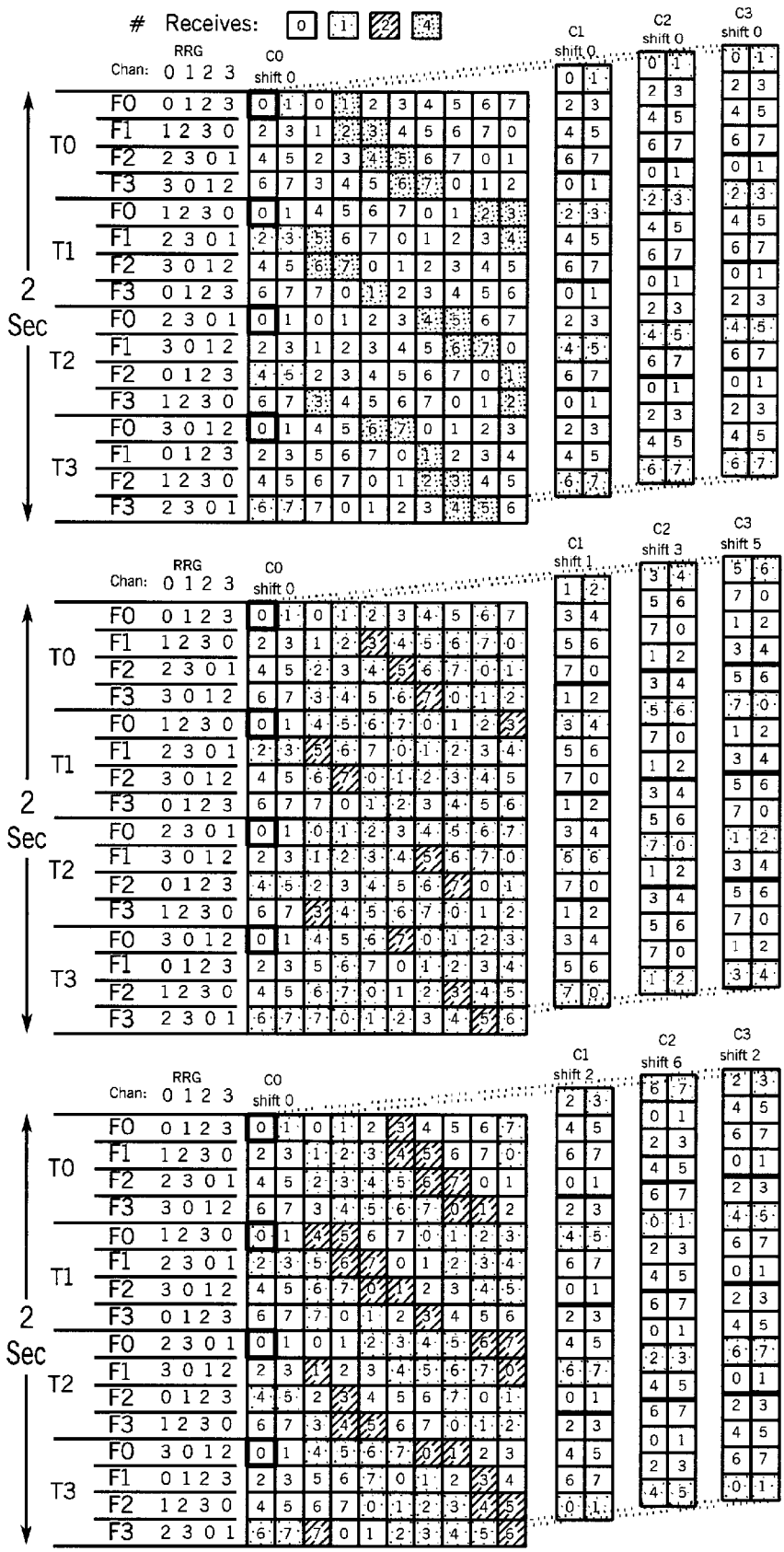
FIG. 13 is a diagram illustrating an exemplary shifting transmit schedule for each channel.
Figure 14:
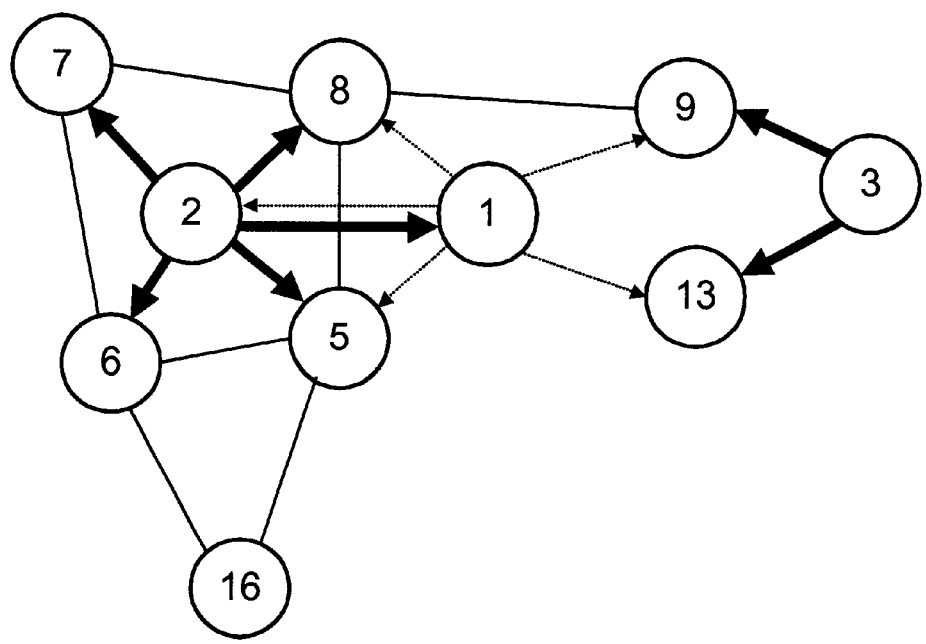
FIG. 14 is a general diagram illustrating a network of nodes showing traffic associated therewith.

The first three (3) epochs produced by this shift schedule are depicted in FIG. 13, where the active receivers for broadcast slot 0 channel 0 are shown shaded with the degree of shade representing the number of active receivers. Note that in this diagram the times of the receptions are significant only with respect to the frame they occur in. Also, the slot numbers correspond to the assigned broadcast slot. As expected, for the twenty (20) transmissions that each node has per period, there are one hundred forty (140) receptions or seven (7) receivers at a time on each channel. It is plain to see that the distribution of receptions is different for every cycle. What is not so evident is that over the 16-second period each node has an equal number of opportunities to receive each transmitter, but this can be shown with the following analysis:

(a) In every 4-frame cycle all nodes have an equal opportunity to receive on all channels. This is because during this time each RRG visits each channel once. Thus, during the 16-second period all nodes visit each channel equally.

Since in every 2-second epoch all receivers are active except while transmitting, the transmissions they will miss are the ones either being transmitted on a channel other than the one they are listening to or while they themselves are transmitting. But step (a) shows that they will miss an equal number on all channels, so we must only account for the ones missed while each node is transmitting. In other words, if each transmitter has an equal opportunity of missing transmissions from all other simultaneous transmitters, then the receive opportunities are equal.

Now, in any particular 2-second epoch the simultaneous transmitting nodes on each channel have a relationship specified by the shift schedule of the above table. The table itself corresponds to broadcast slot 0 but there is a similar schedule for the other seven (7) slots. If we can show that each of the simultaneous transmitters for slot 0 misses the same number of transmissions from slot 0 over the 16-second period, then by step 2 the receive opportunities are equal.

It is a simple matter of counting in the table to see that each slot aligns with slot 0 exactly three (3) times per 16-second period so by step (c) the receive opportunities are equal.

One other optimization can be made to minimize the latency that is caused by the clumping of slots each epoch. For example, epoch 0 has 4 receivers in only one or two slots per frame resulting in a latency of a half-second or more between receives opportunities at any particular node. Since other epochs have a more even distribution of receivers per frame worst case latency could be reduced by methodically swapping frames from high latency epochs with corresponding frames in low latency epochs.

6. Error Detection and Retransmission

Some types of traffic benefit from reliable hop-by-hop transmissions. That is, if incorrectly received packets and collisions are detected, the affected packets can be retransmitted. This is achieved in USAP-MA 10 with a bitmap in the bootstrap packet representing each slot in the frame where each bit means that a packet was correctly received in the corresponding slot. If a node had previously transmitted in a slot, then it can tell if its intended receiver(s) correctly received the packet and, if not, then retransmit it. This technique applies equally well to transmissions in the broadcast, standby, and reservation slots. Of course, some types of traffic, such as voice traffic, do not benefit from retransmissions. Thus, the retransmission facility can be applied selectively.

7. Bootstrap Packet Format

The bootstrap packet consists almost entirely of the USAP assigned slot sets STi, SRi, and NTi. The broadcast and reservation slots are managed separately and encoded slightly differently. There is a map of two (2) bit fields that correspond to every slot, yielding two (2) bits*8 slots*5 channels=80 bits for the reservation slots and 2 bits*8 slots=16 bits for the broadcast slots. The two (2) bit fields are combined into what is called the Assigned Slots Record (ASR) and are interpreted as follows:

| Broadcast: | 0: unassigned<br>1: self transmit<br>2: self receive<br>3: conflict | Reservation: | 0: unassigned<br>1: self transmit<br>2: self receive<br>3: neighbor transmit or conflict |
|---|---|---|---|

USAP regenerates the STi, SRi, and NTi sets from the ASR when it receives a bootstrap packet from a neighbor. In addition, there is 1 bit for StandbyFree;

1 bit for USAP confirmation;

2 bits to indicate which of 4 channels the broadcast slots are used on;

2 bits for channelized neighborhood cycle (8, 16, 24, or 32-node);

4 bits for 16 second synchronization;

24 bits to identify up to 4 6 bit receiver Ids for unicast reservations; and 10 bits for error detection.

In this way the entire functionality of USAP-MA 10 described up to this point is packed in about eighteen (18) bytes. Alternatively, this eighteen (18) byte packet may be of any size that is suitable for the given resources and should not be considered limiting.

8. Neighbor Segregation

A problem with adapting transmission parameters on a broadcast channel is that a node may have to use parameters that work with the worst neighbor to insure that all nodes receive the broadcast. A worst cast scenario is when a node has a set of good quality neighbors that it would normally be able to transmit to at a high rate but it is stuck using a low rate to achieve reliable transmissions to a single poor neighbor. The USAP-MA 10 solution is to segregate neighbors (controlled by neighbor segregation heuristic 132, FIG. 2) into 2 (or more) groups and adjust the transmission parameters to each of them independently. In this way a node could transmit to its good neighbors at an efficient high rate and its poor neighbors at a robust lower rate.

Of course, in order to use two different rates, a node either needs to have different transmission opportunities or be able to change rates in the middle of a packet. Between the broadcast and standby slots a node nominally has two broadcast opportunities. Since the standby slot has lower latency and the potential for higher throughput it makes sense to use it for the high quality neighbors and use the broadcast slot for the poorer neighbors. Of course, if all neighbors are equally good then both slots can be used interchangeably.

Packets that must go to all neighbors (like routing updates) or to one or more of the poor neighbors would thus use the broadcast slot. Packets destined for the good neighbors would use the standby slot unless there was room in the broadcast slot left over. Note that the routing should tend to favor the good neighbors, thereby directing most of the packets into the higher rate standby slot.

Besides the increased efficiency of transmitting at higher rates, neighbor segregation also allows the receivers to sample a greater number of data rates, enabling them to better choose the proper transmission parameters for their neighbors.

9. Soft Circuits

One of USAP's strong points is its ability to make allocations on the fly. Since it constantly maintains up-to-date knowledge via the bootstrap packets of the active allocations in its neighborhood, it is always ready to allocate a new transmit slot. Nominally the new allocation must be announced in only one bootstrap before it can be used. Certain types of applications can take advantage of this to eliminate the setup delays and inflexibility of hard circuits 134 (FIG. 2), that is, reserving slots all along a path from source to destination before turning on the traffic. In particular consider voice and video. Once started they continuously supply data that loses its value if it is not delivered very quickly. They are also both tolerant of small amounts of dropped data and data arriving out of order, resulting in small glitches of little consequence to the users.

Now consider a heuristic that simply assigns enough slots on its outgoing links to satisfy the requirements of the traffic entering it. This would allow traffic to push its way through the network reserving the channel resources along the way. When the traffic stops the allocations are automatically released. Called a "soft circuit" 136 (FIG. 2), this heuristic has essentially the same effect as a dedicated circuit setup: if enough slots are available, they are allocated to support the traffic stream. The difference is that it is executed locally at each node rather than coordinated at the end points. Also, the soft circuit heuristic will attempt to fix a broken link locally by routing around it if possible instead of reporting the failure all the way back to the source. Thus, by taking advantage of certain characteristics of the data streams and effectively utilizing the capabilities of USAP 11, soft circuits provide fast, robust support for certain applications.

10. Frame Fitting

Figure 15:
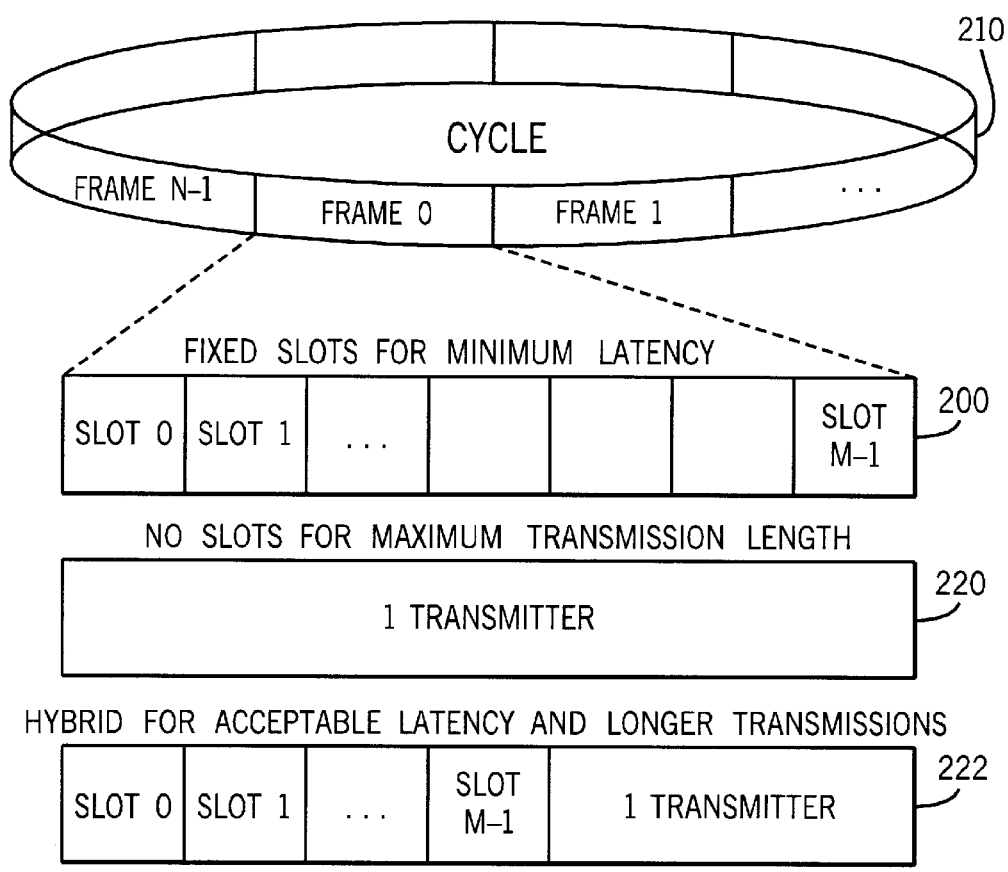
FIG. 15 is a diagram illustrating a time division multiple access structure depicting different frame configurations.

Referring now to FIG. 15, the traditional TDMA frame is broken up into fixed length slots, the size of which and the frequency with which they repeat (the cycle 210) is determined by, among other things, the minimum latency required of the system. This arrangement is optimal for maximum flexibility in assigning channel capacity to carry constant bit rate or high volume point-to-point traffic. An alternative approach is to assign a frame 220 to an individual transmitter or clique (fully connected set) of nodes or to use a random access technique during the frame. This is especially good for efficient broadcast of sporadic datagram traffic and flexibility in using lower data rates that might cause a transmission to exceed smaller slot sizes.

The goals of these two techniques are different so neither will satisfy the requirements of all applications. FIG. 15 also depicts a third option in which a combination of these two techniques can be used in a hybrid frame 222 to achieve acceptable performance for a limited amount of different types of traffic.

Figure 16:
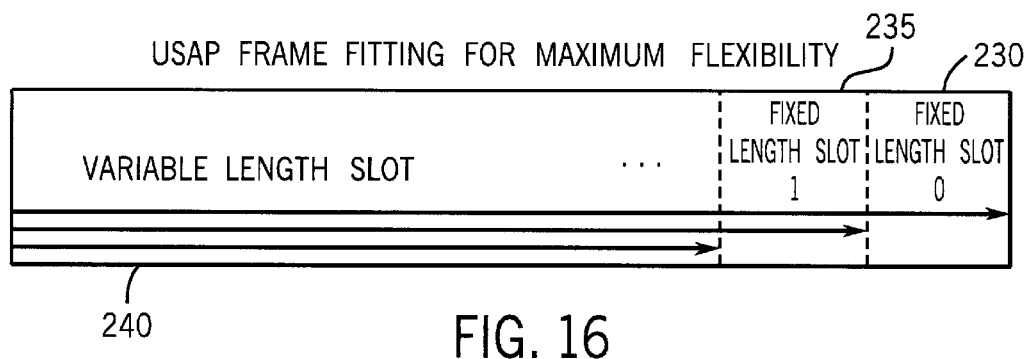
FIG. 16 is a diagram illustrating a variable length slot frame.

For maximum flexibility a USAP heuristic called Frame Fitting (USAP FF) allows the TDMA slots to be dynamically reconfigured as needed to handle changing traffic requirements. Initially the frame consists of a single slot that can be assigned for use by those applications best suited for this type of configuration. As low latency, constant bit rate, or high throughput traffic appears, the traffic can be assigned to new fixed length slots 230 and 235 allocated from the end of the frame, as depicted in FIG. 16.

A new fixed length slot (FLS) is assigned from the end of the frame because it decreases the chance that a transmission in the variable length slot (VLS) 240 will be disrupted. Indeed, there are a number of ways to minimize such disruptions. First of all, there is some chance that the VLS transmission will terminate prior to the new FLS since the amount of traffic in a VLS typically varies from frame to frame. Otherwise, if USAP confirmations are used, the VLS length will be adjusted by all affected nodes before the new FLS is activated. Even if USAP confirmations are not used (as in USAP Logical Neighborhooding (USAP LN), which is the subject of U.S. application Ser. No. 09/303,526 entitled Unifying Slot Assignment Protocol Logical Neighborhooding and is herein incorporated by reference) a transmitter can postpone using a new FLS as long as it is receiving a VLS packet during that FLS, although this will not help if the VLS transmitter is more than one hop away. If nothing else, a delay can be imposed before the first use of the FLS to help ensure that all affected nodes have adjusted the length of their VLS. This delay can even be a natural consequence of a typical virtual circuit setup delay.

When an FLS is no longer needed, it will be released and if it happened to be contiguous to the VLS then the VLS can be lengthened. Otherwise, the VLS will remain constrained by the last FLS assigned unless the remaining FLSs can be coalesced.

Figure 17:
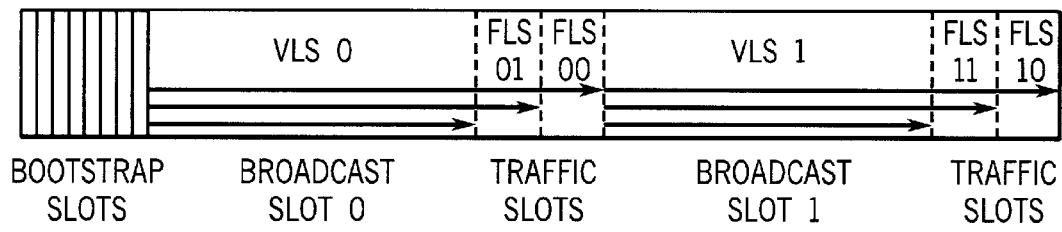
FIG. 17 is a diagram illustrating the USAP Frame Fitting Structure.

USAP FF adapts naturally to the USAP LN or to the USAP MA frame structure. The main difference is that both broadcast slots are no longer at the beginning of the frame but rather are evenly split between the first and second half of the frame as VLS 0 and VLS 1, as depicted in FIG. 17. The traffic slots can then be assigned from the end of either VLS 0 or VLS 1 and ideally kept evenly distributed between the two.

USAP FF provides distinct performance advantages over the current static slot boundaries. First of all, since the broadcast slots can be as large as half of the frame, datagram capacity can be up to five (5) times what it currently is without soft circuits or other means of assigning traffic slots for datagram use. Another way of looking at this is that except for occasional gaps between FLSs, there are no unassigned slots. An FLS is either assigned or it automatically becomes part of a VLS.

Another advantage to USAP FF is that the enlarged broadcast slot will allow for lower data rates during degraded mode operation. Assuming that all traffic slots are abandoned in this mode, the broadcast slot would be five (5) times as large as before, thereby allowing a cell to be sent at one quarter (¼) the current lowest data rate or 31.25 bits per second (bps) without resorting to smaller cell sizes, which would complicate the software.

Alternatively, to more effectively use the enlarged broadcast slot it is desirable to provide the ability to change data transmission rates in the middle of a communication packet. This ability allows for part of the communication packet to be adapted to poorer quality neighbors (i.e., neighbors to which communications are preferably transmitted at a lower transmission rate to ensure reliable receipt) while allowing for higher throughputs to better quality neighbors (i.e., neighbors which can reliably receive communications at a higher rate of transmission).

USAP 11 can manage the resource allocations for many types of TDMA architectures that operate in a distributed dynamic environment. The user needs and application requirements drive the design of heuristics to cause USAP to assign the right mix of permanent or on-demand allocations. USAP-MA is an example of such an integrated family of heuristics that supports the requirements of the tactical military and commercial environment. It does this by providing broadcast and unicast transmissions, datagrams for bursty data and hard and soft circuits for high capacity or low latency streams, selective hop-by-hop reliability to minimize end-to-end retransmissions, sparse and dense neighborhood optimizations, and the ability to scale to large networks.

It is understood that while the detailed drawings and examples given describe preferred exemplary embodiments of the present invention, they are for the purposes of illustration only. The method and apparatus of the invention is not limited to the precise details and conditions disclosed. For example, it is not limited to the specific time frame and time slot lengths, or to the number of cycles, or to the inclusion of all of the heuristics discussed. As another example, the protocols discussed herein, such as the frame fitting heuristic, the adaptive broadcast cycle heuristic, the bootstrap slot heuristic, the channelized neighborhood heuristic, and the neighbor segregation heuristic, may be developed using approaches other than heuristics, such as deterministic or probabilistic approaches, or any combination thereof. Various changes may be made to the details disclosed without departing from the spirit of the invention, which is defined by the following claims.

What is claimed is:

1. A method for automatically managing communication channel resources between nodes having neighboring nodes in a network of nodes, each node being configured to communicate during specific time slots on a time multiplex basis, the method comprising:

communicating between nodes in the network using a time division multiple access structure, the time division multiple access structure including time divisions having time frames, each time frame having at least one time slot;

storing, at each node, an assignment of possible time slots to communicate between nodes in the network;

designating the at least one time slot in a first time frame as a first variable length slot;

assigning the first variable length slot to a particular node in the network;

updating, at the neighboring nodes of the particular node, the assignment of possible time slots to include the assignment of the first variable length slot;

determining a need to increase the number of slots within the first time frame;

shortening the length of the first variable length slot to allocate a first fixed length slot at the end of the first variable length slot; and updating, at the neighboring nodes of the particular node, the assignment of possible time slots to include the assignment of the first fixed length time slot.

2. The method as recited in claim 1, wherein the first fixed length slot is allocated at the end of the first time frame.

3. The method as recited in claim 2, further comprising:

allocating a second variable length slot in the first time frame; and allocating a second fixed length slot at the end of the second variable length slot.

4. The method as recited in claim 3, further comprising:

designating the first and second variable length slots as first and second broadcast slots.

5. The method as recited in claim 4, further comprising:

transmitting a communication packet in the first or second broadcast slot at more than one transmission rate.

6. A method for automatically managing communication channel resources between nodes having neighboring nodes in a network of nodes, each node being configured to communicate during specific time slots on a time multiplex basis, the method comprising:

communicating between nodes in the network using a time division multiple access structure, the time division multiple access structure including time divisions having time frames, each time frame having at least one time slot;

storing, at each node, possible time slots to communicate between nodes in the network;

allocating a variable length broadcast slot from the at least one time slot in a time frame;

communicating the allocation of the variable length broadcast slot to the nodes in the network;

allocating a fixed length slot at the end of the time frame;

communicating the allocation of the fixed length slot to the nodes in the network;

selectively releasing the fixed length slot in the time frame;

lengthening the variable length broadcast slot in the time frame if the fixed length slot and the variable length broadcast slot are contiguous; and communicating the release of the fixed length slot and the lengthening of the variable length broadcast slot to the nodes in the network.

7. The method as recited in claim 6, comprising:

controlling contention access between nodes in the network by using a unifying slot assignment protocol.

8. The method as recited in claim 6, further comprising:

transmitting a broadcast communication packet in the variable length broadcast slot to neighboring nodes in the network; and changing rate of transmission of the broadcast communication packet during the variable length broadcast slot.

* * * * *